(12) United States Patent
Sathe et al.

(10) Patent No.: US 11,422,435 B1
(45) Date of Patent: Aug. 23, 2022

(54) CAMERA PRIVACY COVER

(71) Applicant: Microsoft Technology Licensing, LLC, Redmond, WA (US)

(72) Inventors: Rhishikesh A. Sathe, Bothell, WA (US); Lalit Anil Palve, Seattle, WA (US); Kae-Ling Jacquline Gurr, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/350,992

(22) Filed: Jun. 17, 2021

(51) Int. Cl.
G03B 11/04 (2021.01)

(52) U.S. Cl.
CPC .................... *G03B 11/043* (2013.01)

(58) Field of Classification Search
CPC ..................................... G03B 11/041
See application file for complete search history.

(56) References Cited

U.S. PATENT DOCUMENTS

| 9,465,276 | B2 * | 10/2016 | Jonsson | G06F 1/1686 |
| 10,882,661 | B1 * | 1/2021 | Seidler | B65D 21/083 |
| 2014/0198439 | A1 | 7/2014 | De Pietro et al. | |
| 2019/0198212 | A1 * | 6/2019 | Levy | B62J 50/225 |

FOREIGN PATENT DOCUMENTS

| CN | 204217039 U | * | 3/2015 |
| DE | 202011106305 U1 | | 1/2012 |
| EP | 2887139 B1 | | 10/2018 |
| JP | 2004348059 A | * | 12/2004 |
| WO | 2015091470 A1 | | 6/2015 |
| WO | 2019022727 A1 | | 1/2019 |
| WO | 2019059911 A1 | | 3/2019 |

OTHER PUBLICATIONS

VisionTek VTWC40 product page at https://www.visiontek.com/products/vtwc40-premium-autofocus-full-hd-1080p-webcam (Year: 2021).*
Amazon.com product listing for VisionTek VTWC40 at https://www.amazon.com/VisionTek-VTWC40-Premium-Autofocus-901442/dp/B0957XR6X7/ (Year: 2021).*
Jelly Comb W15 Ring Light SteamCam Pro product page at https://www.jellycomb.com/products/w15-stream-camera (Year: 2021).*
W15 Ring Light StreamCam Pro Product Manual (Year: 2021).*
Frame captures of https://www.youtube.com/watch?v=s-pVXR9kV0o by LJP Tech dated Mar. 8, 2021 (Year: 2021).*

(Continued)

*Primary Examiner* — Leon W Rhodes, Jr.
(74) *Attorney, Agent, or Firm* — Rainier Patents, P.S.

(57) ABSTRACT

The description relates to cameras and privacy covers for the cameras. One example can include a body defining a front-end and an opposing back-end that have matching profiles and a lens positioned in the front-end. This example can include an automatically self-aligning and self-retaining opaque privacy cover having a profile that matches both the front-end profile and the back-end profile of the body.

20 Claims, 9 Drawing Sheets

(56) References Cited

OTHER PUBLICATIONS

"Webcam with Microphone Autofocus for Laptop/Desktop/PC, Web cam HD 1080P Distortionless with Privacy Cover & Tripod, USB Computer Web Camera 30fps , Fits Streaming/Conference/ Gaming", Retrieved from: https://www.amazon.com/dp/B08QYVKHD4/ref=sspa_dk_detail_4?psc=1&pd_rd_i=B08QYVKHD4&pd_rd_w=a9KkP&pf_rd_p=4269e1a0-a218-4fbd-9748-1cd337d2f2a5&pd_rd_wg=PI2Mv&pf_rd_r=80QK28J1WXD1SEBPA50E&pd_rd_r=8248a9f4-4bc3-49, Mar. 18, 2021.

Ankur, "12 Best Laptop Camera Cover & Phone Camera Cover", Retrieved from: https://web.archive.org/web/20200921185408/https:/mashtips.com/best-webcam-privacy-cover-slide-phone-camera-sticker/, Sep. 21, 2020, 13 Pages.

Nowland, Morgan, "Iris: The Magnetic Lens Cap System", Retrieved from: https://web.archive.org/web/20180101171031/https:/www.kickstarter.com/projects/716139566/iris-the-magnetic-lens-cap-system, Jan. 1, 2018, 21 Pages.

\* cited by examiner

INSTANCE FOUR

| Privacy cover - front - auto alignment normal force and shear force data with rotation 502 | | | | | | |
|---|---|---|---|---|---|---|
| | Force on Magnet (N) 504 | | | | | |
| Privacy cover rotation (deg) 508 | 0 | 1 | 3 | 5 | 7 | 10 |
| Normal force on each magnet (N) 510 | 0.997 | 0.989 | 0.921 | 0.800 | 0.645 | 0.396 |
| Resultant shear force on each magnet(N) 512 | 0.011 | 0.080 | 0.236 | 0.360 | 0.439 | 0.469 |

| Privacy cover -Back- Auto alignment normal force and shear force data with rotation 602 | | | | | | |
|---|---|---|---|---|---|---|
| | Force on Magnet (N) 604 | | | | | |
| Privacy Cover Rotation (deg) 608 | 0 | 0.5 | 1 | 3 | 5 | 7 | 10 |
| Normal force on each magnet (N) 610 | 1.194 | 1.190 | 1.180 | 1.074 | 0.888 | 0.664 | 0.329 |
| Resultant shear force on each magnet(N) 612 | 0.004 | 0.060 | 0.118 | 0.327 | 0.479 | 0.558 | 0.549 |

CAMERA PRIVACY COVER

BACKGROUND

Cameras including video cameras have expanded into many roles. Cameras have become ubiquitous for remote video communication. Users appreciate the enhanced interaction offered by video communication when compared to voice only communications. However, many users worry that they will be recorded when they don't intend to be. The present concepts address these and/or other issues.

SUMMARY

The description relates to cameras and privacy covers for the cameras. One example can include a camera body defining a front-end and an opposing back-end that have matching profiles and a lens positioned in the front-end. This example can include an automatically self-aligning and self-retaining opaque privacy cover having a profile that matches both the front-end profile and the back-end profile of the body.

This example is intended to provide a summary of some of the described concepts and is not intended to be inclusive or limiting.

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the figure and associated discussion where the reference number is first introduced. Where space permits, elements and their associated reference numbers are both shown on the drawing page for the reader's convenience. Otherwise, only the reference numbers are shown.

DESCRIPTION

The present concepts relate to camera privacy covers that magnetically attach to the front of the camera to block camera function and protect user privacy when the camera is not in use. When the camera is in use, the camera privacy cover can be magnetically stored on the back/rear of the camera to avoid being misplaced. The magnetic attraction between the camera privacy cover and the camera can be leveraged to cause the privacy cover to be self-aligning and self-retaining to both the camera front and the camera back. These self-aligning and self-retaining features can enhance the user experience because the user does not need to perfectly position the privacy cover on the camera front or the camera back. Instead, the user just gets it close and the self-alignment and self-retention features do the rest. Thus, the present camera privacy covers can be viewed as self-aligning and self-retaining privacy covers.

Cameras, such as cameras that tend to be used in video conferencing scenarios have offered various techniques to inform the user whether the camera is recording or not. Many of these techniques are electronic in nature and for instance, provide notice, such as a light when the camera is recording. However, many users worry about the camera being hacked and recording even though it indicates that it is not. Other user concerns are more benign, but no less worrisome, users worry that they will simply overlook the electronic notice that the camera is recording. Toward this end, many users prefer a physical privacy cover that optically blocks the camera lens. However, existing solutions have not proven satisfactory. For instance, users tend to find the privacy covers difficult to put on when they are done recording. Further, users tend to misplace the privacy cover when they take it off while recording. The present self-aligning and self-retaining privacy cover concepts can address these and/or other issues.

FIG. 1A-1E collectively show an example system 100 that can include a camera 102. In this case, the camera 102 is operating cooperatively with a device 104 in the form of a digital whiteboard and/or can be used with other devices.

Figure 1A:
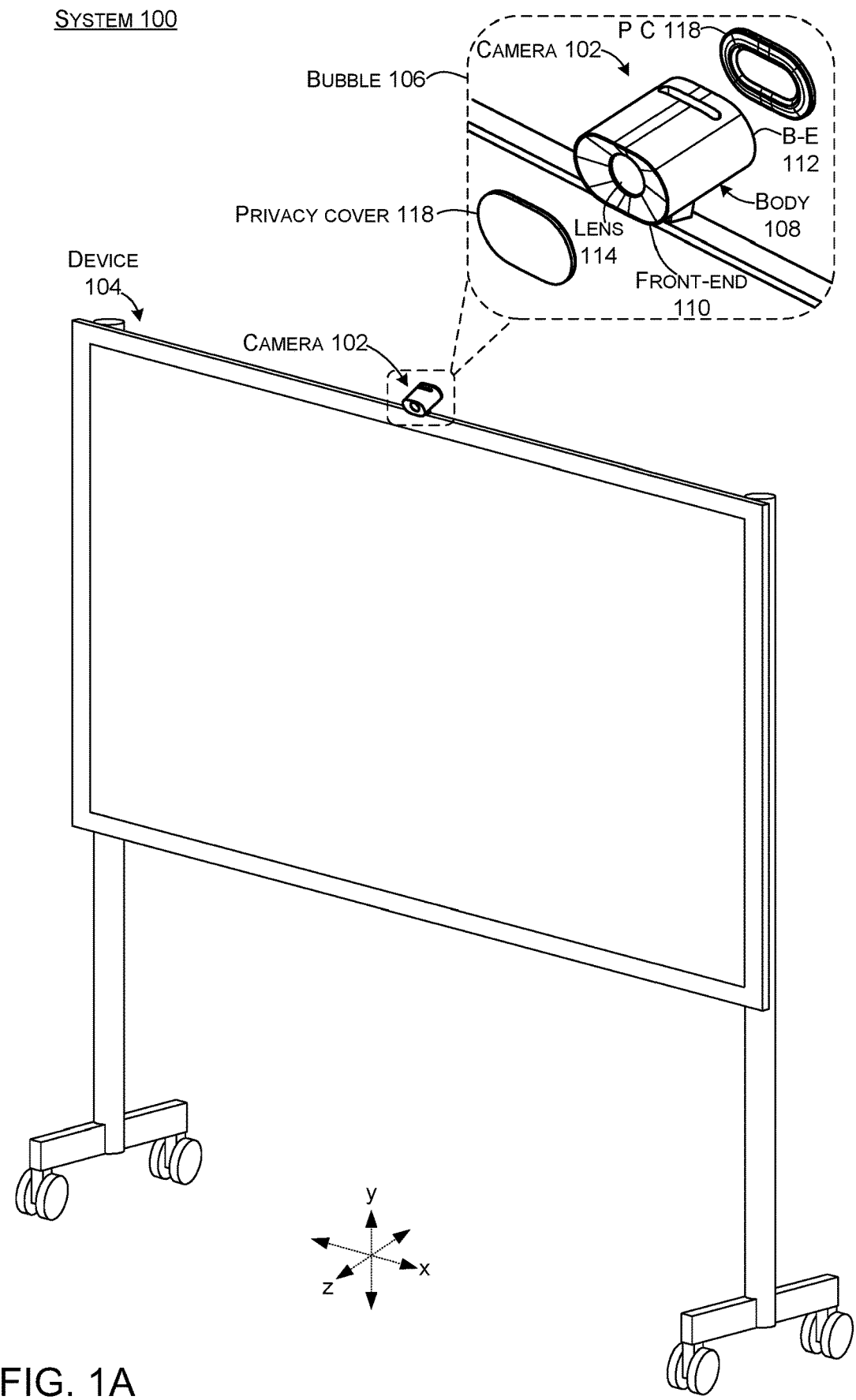
FIGS. 1A-1E, 2A, 2B, 3A-3C, 4A-4C, and 7 show perspective views of example devices and systems in accordance with some implementations of the present concepts.
Figure 1B:
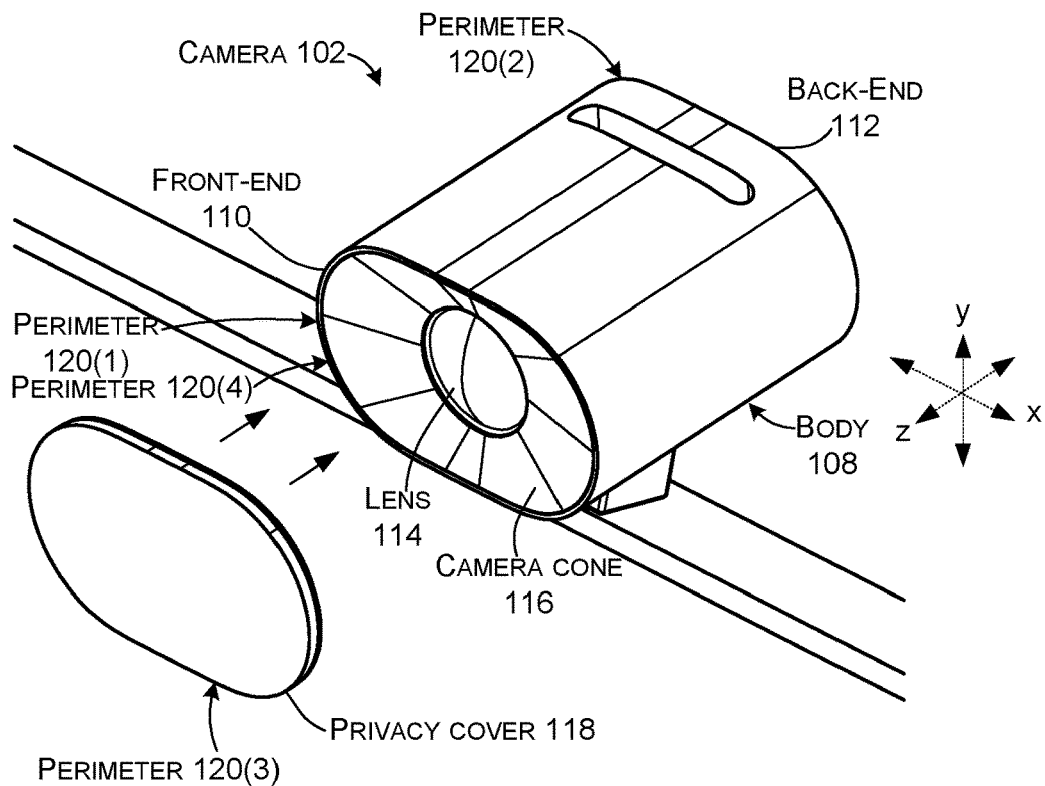
Figure 1C:
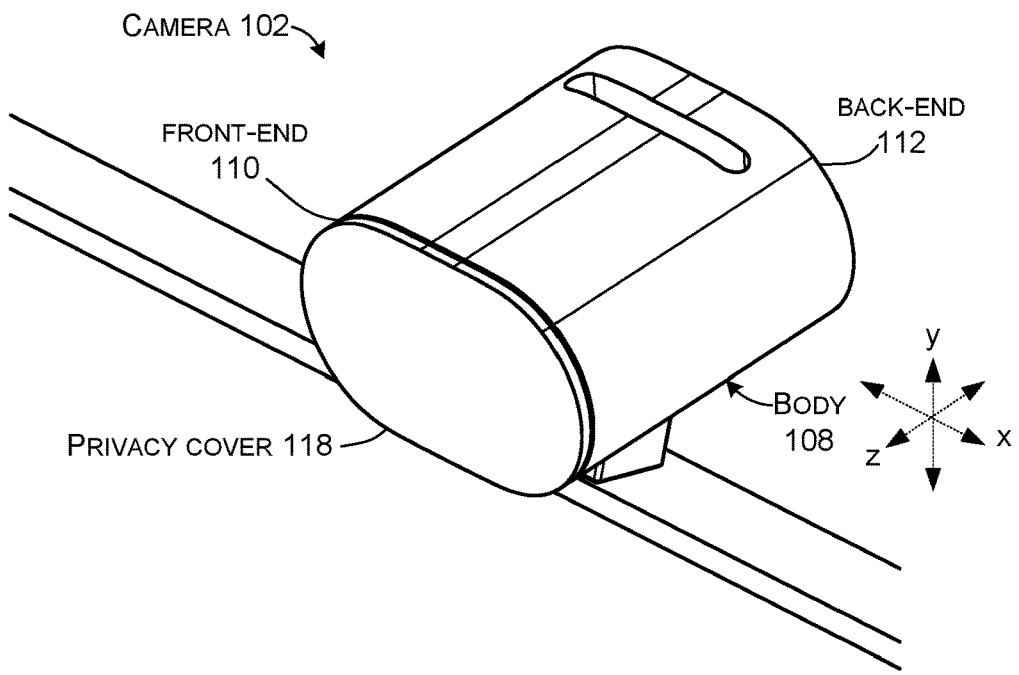
Figure 1D:
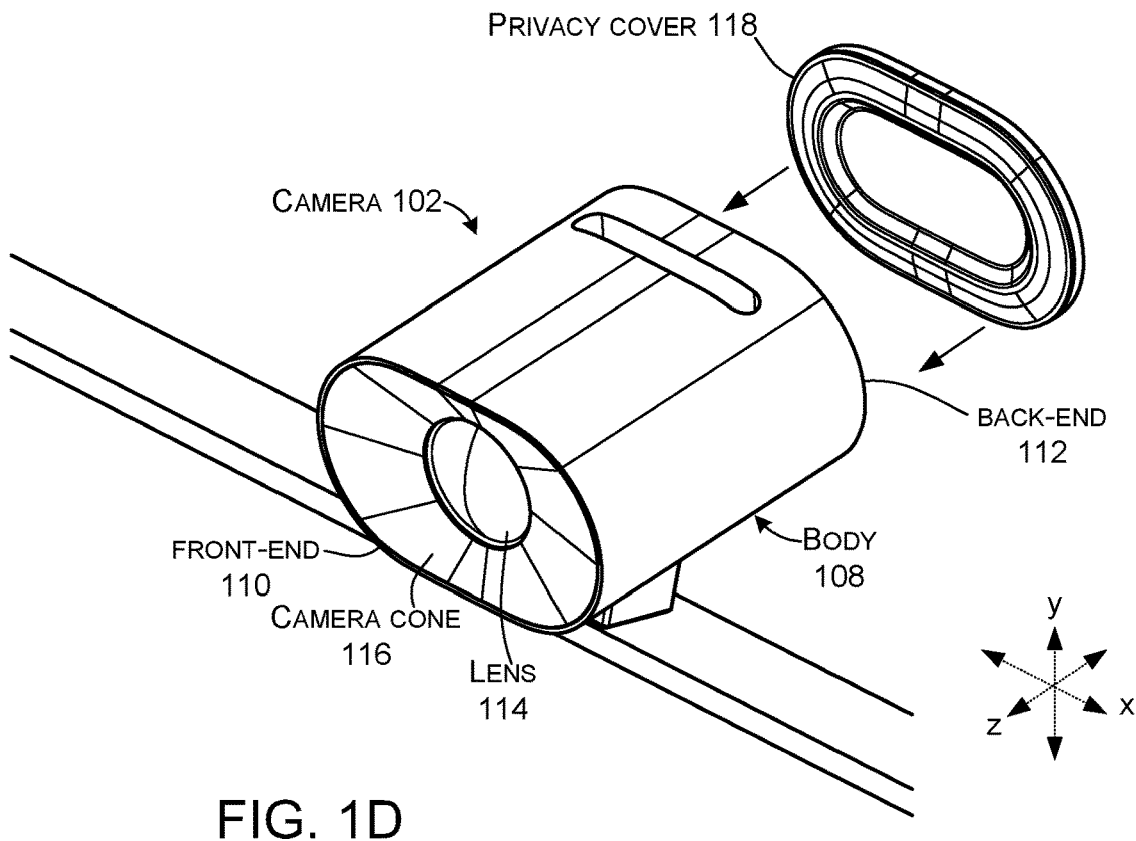
Figure 1E:
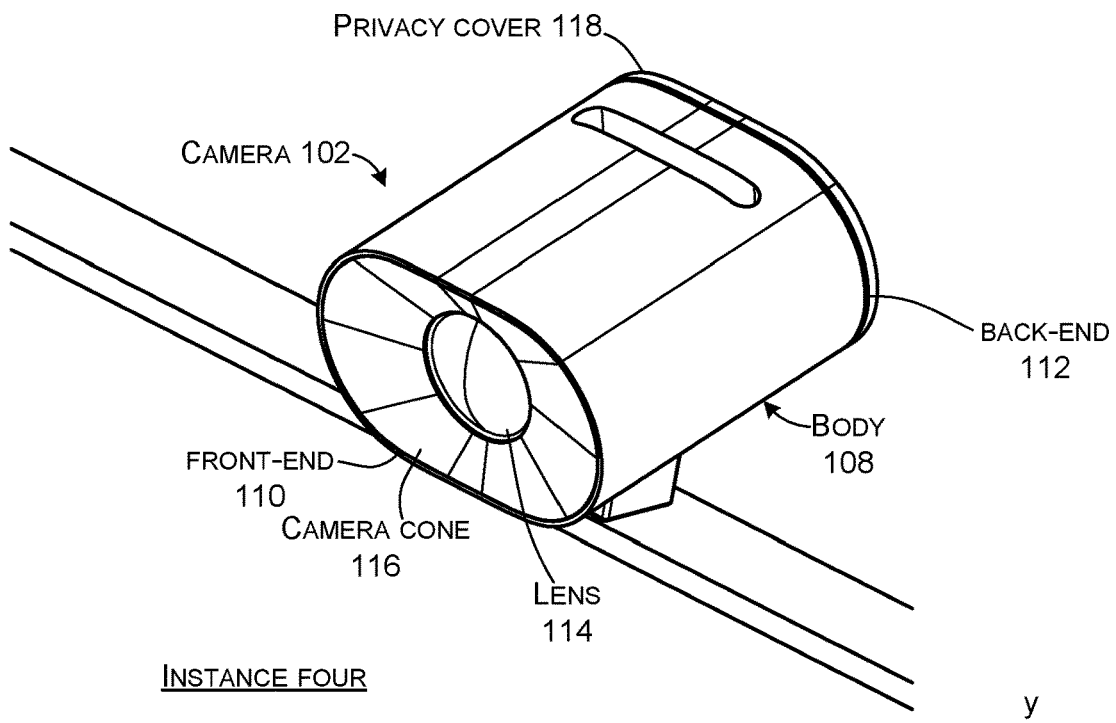

An enlarged view of the camera 102 is shown in bubble 106 of FIG. 1A. The camera 102 can include a body 108, that defines a front-end 110 and an opposing back-end 112. FIGS. 1B and 1C show close-up views of the front-end 110 of the camera 102. FIGS. 1D and 1E show close-up views of the back-end 112 of the camera 102.

The camera 102 can include a lens 114 positioned in the front-end 110, such as in a camera cone (e.g., parabolic member) 116 (FIG. 1B) that can have a curved surface. The camera 102 can be optically blocked by a self-aligning, self-retaining, opaque, privacy cover (e.g., privacy cover) 118 that can be positioned by the user as desired.

In many use case scenarios, users want to utilize the camera 102 to capture images of them in front of the digital whiteboard device 104 as they use the digital whiteboard device 104. For instance, the user may engage in a video call scenario and appreciate the visual aspect added by the camera to better simulate face-to-face discussions. However, sometimes the user does not want to be captured by the camera 102. Existing techniques allow the user to turn the camera on or off electronically, such as via a control on a graphical user interface (GUI) of the device. However, sometimes users can be uncertain whether the camera is actually on or off. This uncertainty can produce hesitancy to utilize the device and/or the user may be distracted by the uncertainty. Other existing technologies provide physical privacy covers, but they tend to be inconvenient because the user has to position them perfectly on the camera and may lose them when removed.

The present concepts provide a technical solution offered by the privacy cover 118 that can physically cover the lens 114 when the camera 102 is not being used. FIG. 1B shows the privacy cover 118 ready for positioning over the lens 114. FIG. 1C shows the privacy cover 118 positioned on the front-end of the camera 102 and optically occluding the lens 114. The privacy cover 118 can be readily seen when in place over the lens 114 to give the user visual confirmation (e.g., peace of mind) that they are not being recorded.

When the user wants to employ the camera 102, the user can simply remove the privacy cover 118 from the front of the camera (e.g., front-end 110) and place it on the back of the camera (e.g., back-end 112) as shown in FIGS. 1D and 1E. The privacy cover 118 will be automatically retained on the back-end 112 to avoid misplacement. Similarly, when the privacy cover 118 is stored on the back-end 112 the user can visually confirm that the lens is unobstructed and the camera is ready to go. (Note that in bubble 106 of FIG. 1A, the privacy cover 118 is shown ready to be positioned on both the front-end 110 and the back-end 112. This is for purposes of explanation and is not intended to convey that there are two privacy covers.)

Looking again at FIGS. 1B and 1C, when the user wants to cover the camera 102 again, the user simply pulls the privacy cover 118 off of the back-end 112 and brings the privacy cover close to the front-end 110. The privacy cover 118 will automatically self-align into the proper orientation as it is attracted to and retained against the front-end 110. The self-alignment and self-retention features are described in more detail below relative to FIGS. 3-6.

In this implementation, the front-end 110 and the back-end 112 have similar or the same perimeters (e.g., shape and size) 120(1) and 120(2). In this example, the perimeters 120 can be elongate; in this case horizontally elongate (e.g., along the x reference axis). In this implementation, the privacy cover 118 can have a perimeter 120(3) that is the same as the front-end perimeter 120(1) and the back-end perimeter 120(2). This configuration can enhance the aesthetic appeal of the camera 102. Functionally, this configuration can reduce the chances of the privacy cover 118 accidentally being knocked off the front end 110 or the back end 112. The similar perimeters combined with the self-alignment and self-retention features also reduce the chance of misalignment of the privacy cover that could allow a partial image to be recorded due to a skewed privacy cover.

In the illustrated configuration, as labeled on FIG. 1B, a perimeter (e.g., profile) 120(4) of the camera cone 116 is the same as the perimeter 120(1) of the front-end 110 and the perimeter 120(2) of the back-end 112. In other configurations, the perimeter 120(4) of the camera cone 116 may be different (e.g., smaller and/or different shape) than the perimeter 120(1) of the front-end 110 of the camera 102. In such cases, the perimeter 120(3) of the privacy cover 118 can match the perimeter 120(4) of the camera cone 116 or the perimeter 120(1) of the front-end 110. For instance, the camera cone 116 could be circular and be positioned in a rectangular front end. The privacy cover 118 could have the circular perimeter of the camera cone or the rectangular perimeter of the front end.

Figure 2A:
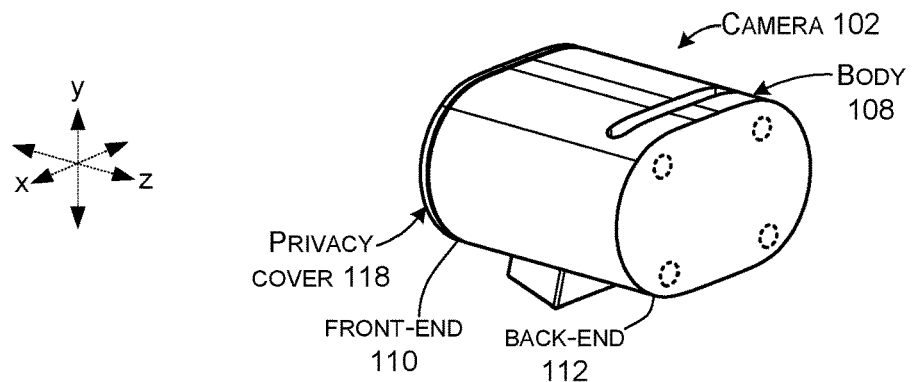
Figure 2B:
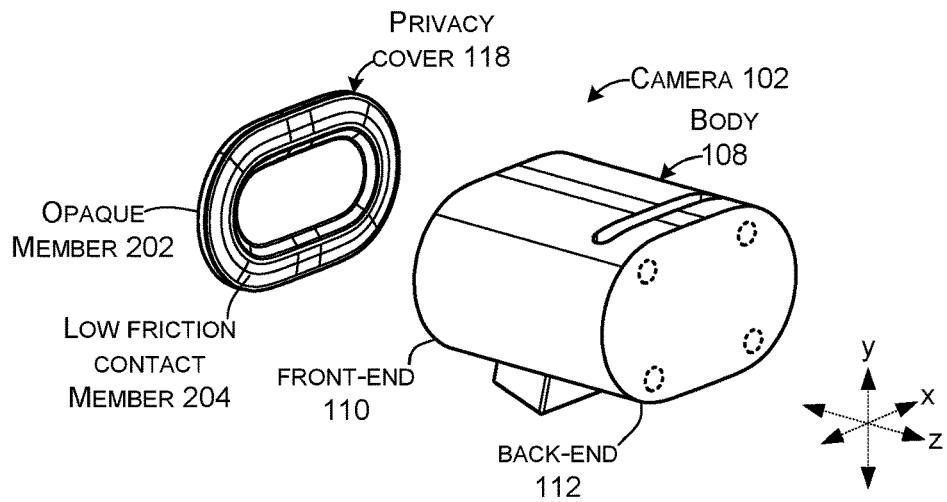
Figure 2C:
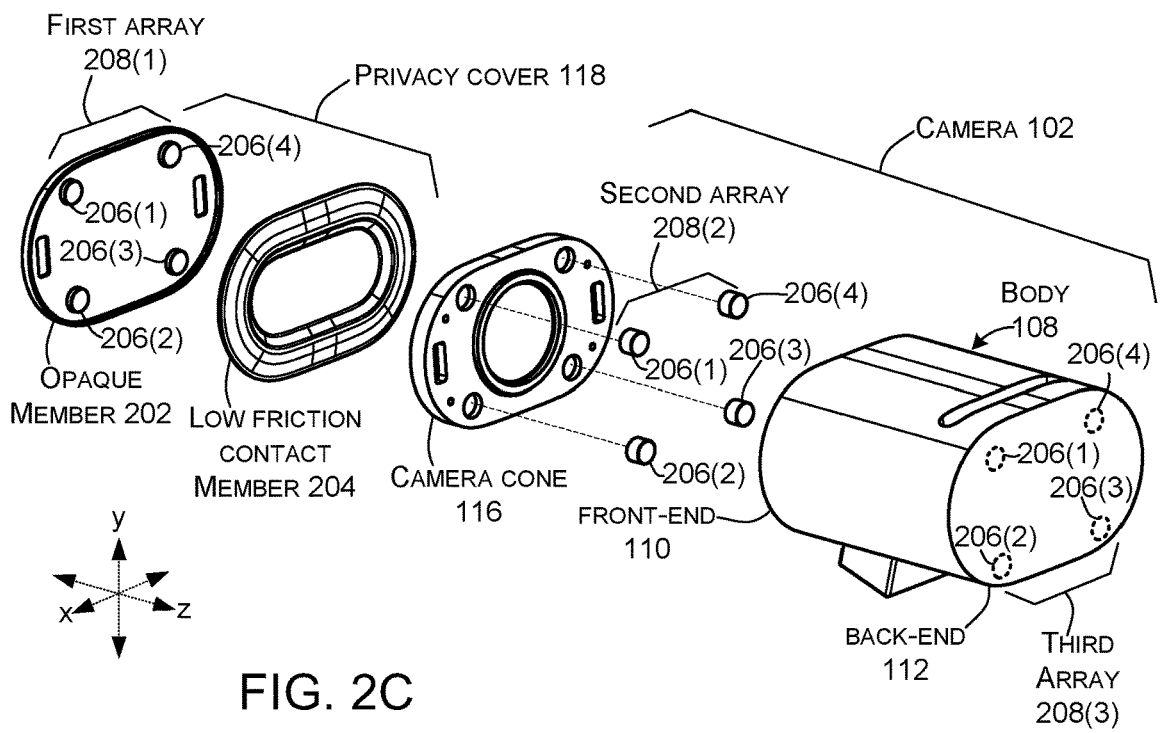
FIG. 2C shows an exploded perspective view of an example device and system in accordance with some implementations of the present concepts.
Figure 3A:
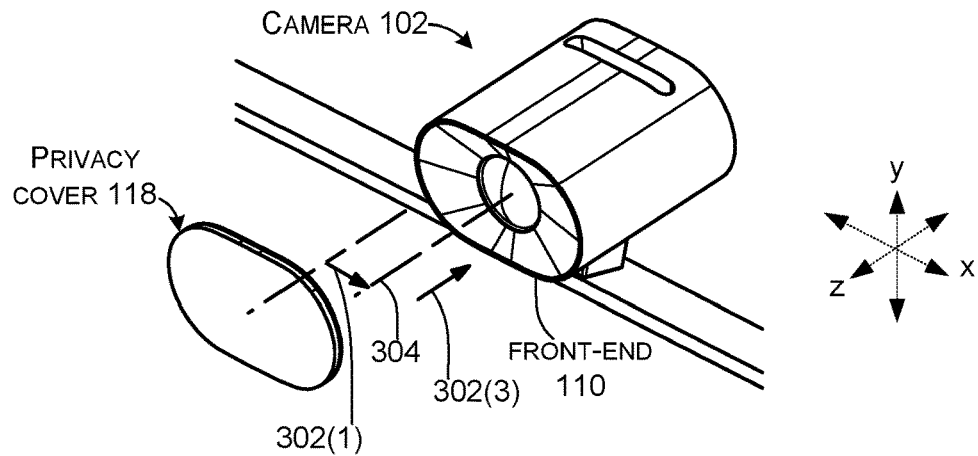
Figure 3B:
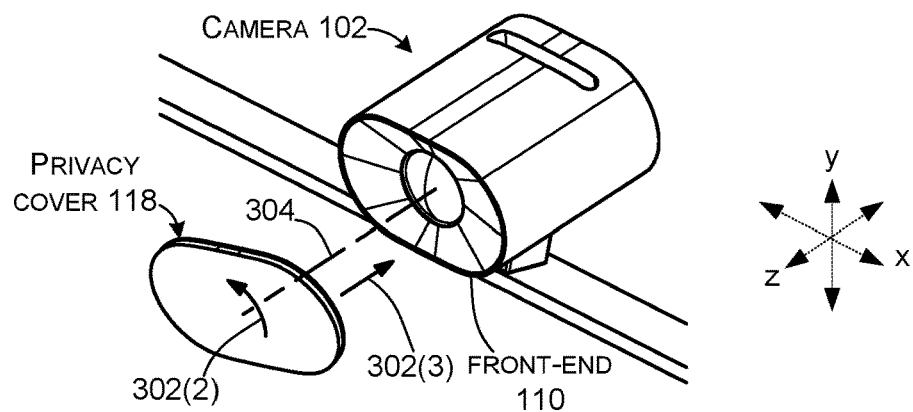
Figure 3C:
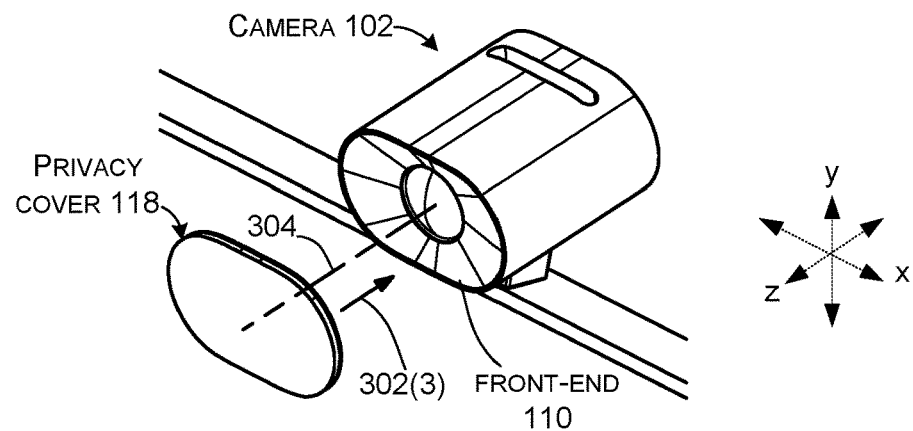
Figure 4A:
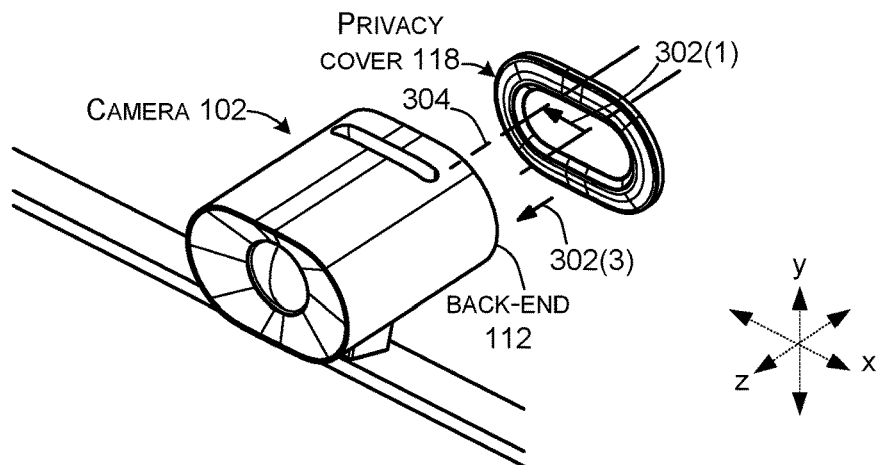

FIGS. 2A-2C, 3A-3C, and 4A-4C collectively show additional details of camera 102 and privacy cover 118. FIG. 2A shows a perspective view of the camera 102 with the privacy cover 118 installed on the front-end 110. FIG. 2B shows a perspective view of the camera 102 with the privacy cover 118 positioned in front of, but spaced away from, the front-end 110. FIG. 2C shows an exploded view of the camera 102 and the privacy cover 118. FIG. 3A shows a situation where the privacy cover 118 is offset linearly (in this case in the x reference direction) from the front-end 110 of the camera 102. FIG. 3B shows a situation where the privacy cover 118 is offset rotationally (around the z reference axis) from the front-end 110 of the camera 102. FIG. 3C shows a situation where the privacy cover 118 is aligned with the front-end 110 of the camera 102. FIG. 4A shows a situation where the privacy cover 118 is offset linearly (in this case in the x reference direction) from the back-end 112 of the camera 102. FIG. 3B shows a situation where the privacy cover 118 is offset rotationally (around the z reference axis) from the back-end 112 of the camera 102. FIG. 3C shows a situation where the privacy cover 118 is aligned with the back-end 112 of the camera 102.

In this case, as shown in FIG. 2B, the privacy cover 118 includes an opaque member 202 and a low friction contact member 204. FIG. 2C shows the privacy cover 118 and the camera 102 can include multiple magnetic elements 206. In this case, four magnetic elements 206 are arranged in a first array 208(1) in the opaque member 202. Four magnetic elements 206 are arranged in a second array 208(2) in the camera cone 116 and four magnetic elements 206 are arranged in a third array 208(3) in the back-end 112. (The magnetic elements 206 of the third array 208(3) are shown in ghost to indicate that they could be occluded in this view by the back-end of the body 108.) In some implementations, all magnetic elements are magnets. In other implementations, some magnetic elements can be magnets while others can be materials that are affected by magnets, such as ferromagnetic materials.

In this case, the magnetic elements 206 of the first array 208(1) are arranged in a same size and shaped array as the magnetic elements 206 of the second array 208(2) and the third array 208(3). In this implementation, the magnetic elements 206 of each array define the corners of a rectangle. In some implementations, the rectangle is a square (e.g., the magnetic elements are spaced equal distances apart (evenly spaced) from one another). This configuration provides a technical solution of solving issues associated with improper installation. For instance, this 'square' or 'rectangular' configuration positioned symmetrically around the axis of rotation (designated relative to FIG. 3A) eliminates the distinction between top and bottom so the user doesn't have to worry if they have the privacy cover 118 oriented properly (e.g., top to top is equivalent to top to bottom). Other shapes and configurations are contemplated.

As shown in FIGS. 2C and 3A-3C, magnetic forces (represented by arrows 302) between magnetic elements 206 of the first array 208(1) and magnetic elements of the second array 208(2) can create a force on the privacy cover 118 when it is proximate to the front-end 110 of the camera 102. When the first array 208(1) and the second array 208(2) are misaligned (e.g., linear offset as shown in FIG. 3A) and/or rotated (e.g., rotational offset) as shown in FIG. 3B), the magnetic forces 302 can work cooperatively to align the privacy cover 118 at a specific or desired orientation with the front end 110 (e.g., the orientation shown in FIG. 1C).

The magnetic forces 302 can include shear forces represented by arrows 302(1) and 302(2) that serve to align (e.g., move and/or rotate the privacy cover in the xy reference plane toward alignment). More specifically, arrow 302(1) of FIG. 3A represents lateral magnetic forces between the privacy cover 118 and the camera 102 and arrow 302(2) of FIG. 3B represents rotational magnetic forces between the privacy cover 118 and the camera 102 relative to an axis of rotation 304). As shown in FIG. 3C, as alignment improves the magnet arrays provide increased normal force magnetic attraction represented by arrow 302(3) in the z reference direction to hold the privacy cover 118 against the front-end.

As can be seen from FIG. 2C, this balance between shear and normal magnetic forces can be achieved through pairs of magnets 206 in the two arrays 208(1) and 208(2). For instance, magnet 206(1) of first array 208(1) can interact with magnet 206(1) of second array 208(2), magnet 206(2) of first array 208(1) can interact with magnet 206(2) of second array 208(2), magnet 206(3) of first array 208(1) can interact with magnet 206(3) of second array 208(2), and magnet 206(4) of first array 208(1) can interact with magnet 206(4) of second array 208(2). One example of these magnetic forces is described below relative to FIG. 5.

Figure 4B:
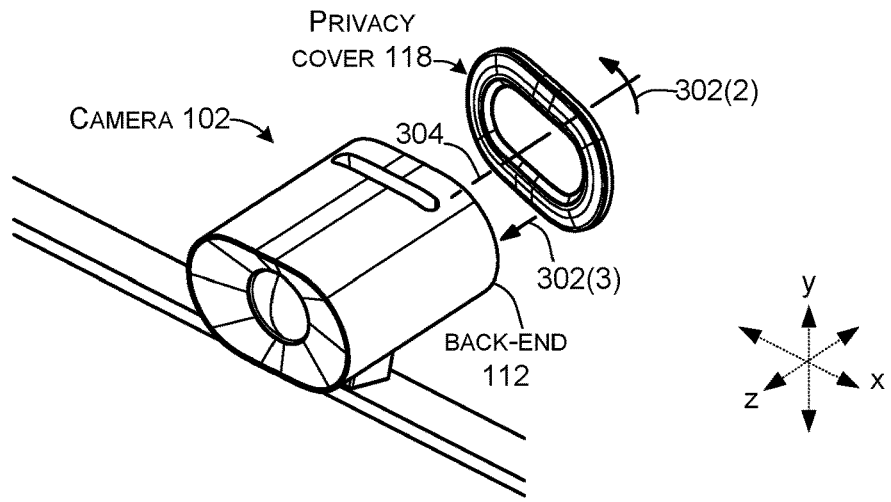
Figure 4C:
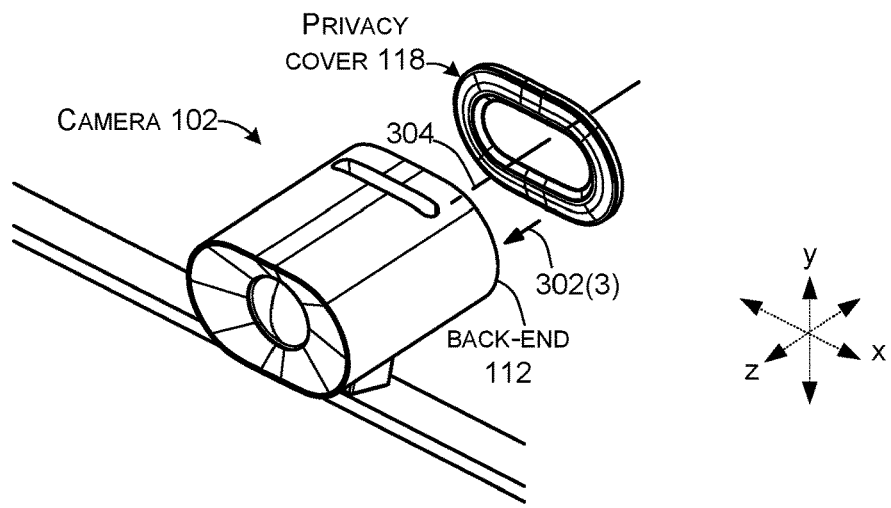

Similarly, magnetic forces between the magnetic elements 206 of the first array 208(1) and the third array 208(3) can create a force on the privacy cover 118 toward and against the back-end 112 of the camera 102 (e.g., in the z reference direction). FIG. 4A shows the magnetic forces 302(1) able to correct linear misalignment (e.g., linear offset) between the privacy cover 118 and the back-end 112. FIG. 4B shows the magnetic forces 302(2) able to correct rotational misalignment (e.g., rotational offset) between the privacy cover 118 and the back-end 112 relative to axis of rotation 304. FIG. 4C shows the normal magnetic forces 302(3) acting to pull the privacy cover 118 toward the back-end 112 and retain the privacy cover against the back-end. One example of these magnetic forces is described below relative to FIG. 6.

The magnetic shear forces can also be viewed as alignment and rotational forces in the x and y reference directions (e.g., along the xy reference plane). The magnetic normal forces can be viewed as retention forces in the z reference direction. The magnetic shear forces serve to align specific points on the privacy cover 118 with specific (e.g., corresponding) points on the front-end 110 or the back-end 112 and the magnetic normal forces serve to pull the privacy cover and the front-end or back-end toward one another.

The magnetic shear forces can be aided by the low friction contact member 204 contacting the camera body 108. In some implementations, the low friction contact member 204 can have a static friction coefficient of 0.3 or less to promote movement between the privacy cover 118 and the camera body 108. The low friction contact member provides a technical solution of a 'slick' interface between the camera and the privacy cover so that the shear magnetic forces can slide the privacy cover from the position that the user installs it to the aligned orientation. In the illustrated implementation, the low friction contact member 204 is manifest as a layer of low friction material, such as polycarbonate/acrylonitrile-butadiene-styrene terpolymer blend (PC-ABS), thermoplastic elastomer (TPE), and/or thermoplastic polyurethane (TPU), among others. In other cases, the low friction contact member 204 can be manifest as a low friction coating, such as a fluoropolymer like polytetrafluoroethylene (PTFE). Other materials for the low friction contact member 204 are contemplated that tend to facilitate sliding between the privacy cover and the camera while tending not to scratch either the back of the camera or the camera cone and not get damaged with multiple use cycles.

The low friction contact member 204 can be positioned on and secured to the opaque member 202 or formed on the opaque member 202, among other configurations. The opaque member 202 can be made from any optically opaque, non-magnetic material, such as aluminum or plastic. In some cases, the opaque member 202 can be made from the same material as the camera body 108 to create an aesthetic unifying appearance.

Figure 5:
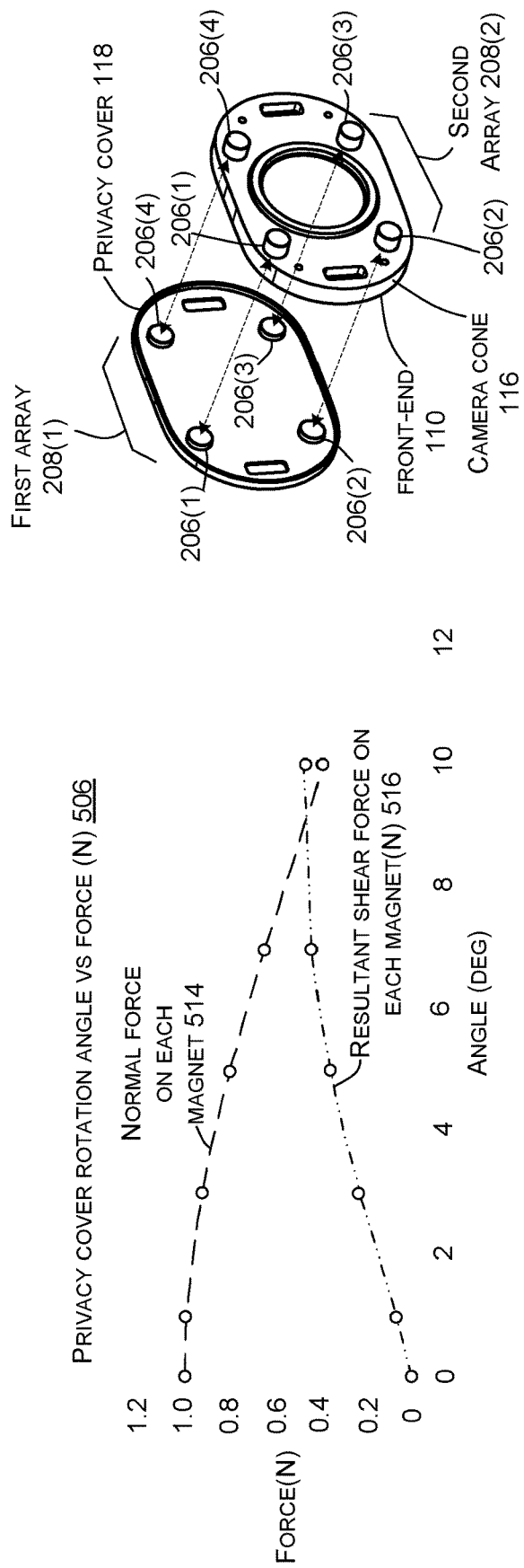
FIGS. 5 and 6 show data associated with an example device in accordance with some implementations of the present concepts

FIG. 5 shows an example implementation for privacy cover-front-auto alignment normal force and shear force with rotation at 502. In this case, the magnets 206 of the first array 208(1) and the second array 208(2) are N52 magnets, though other magnets are contemplated. In this example, the magnets of the first array have a diameter of 6 mm and a thickness of 2 mm and the magnets of the second array have a diameter of 6 mm and a thickness of 4 mm. (Larger magnets are used on the camera, because the shape of the camera cone 116 positions the magnets of the second array 208(2) slightly back from the front-end 110). Magnetic forces are created between individual magnet pairs of the first array 208(1) and the second array 208(2) as soon as the user gets the privacy cover 118 close to the front end 110, such as within a ¼ of an inch and within 10 degrees of rotation plus or minus from the desired orientation. For instance, magnet 206(1) of the first array 208(1) creates magnetic forces with magnet 206(1) of the second array 208(2), magnet 206(2) of the first array 208(1) creates magnetic forces with magnet 206(2) of the second array 208(2), magnet 206(3) of the first array 208(1) creates magnetic forces with magnet 206(3) of the second array 208(2), and magnet 206(4) of the first array 208(1) creates magnetic forces with magnet 206(4) of the second array 208(2).

A force per magnet chart in shown at 504 and a similar graph is shown at 506. The chart includes a row 508 that relates to privacy cover rotation in degrees relative to the camera front-end. Another row 510 relates to normal force on each magnet in Newtons (N). A final row 512 relates to resultant shear force on each magnet in Newtons. Columns represent values for 0 degrees of rotation (e.g., desired, specific or aligned orientation), 1 degree of rotation, 3 degrees of rotation, 5 degrees of rotation, 7 degrees of rotation, and 10 degrees of rotation. This is evidenced as arrow 302(2) on FIG. 3B. Note that the normal force (represented by arrow 302(3) of FIG. 3C) increases as the privacy cover 118 and the front-end 110 approach the desired orientation (fewer degrees of rotational deviation). Thus, the holding or retaining force can be the highest when the privacy cover and the front-end are aligned at the desired orientation. Conversely, the shear forces are highest when the rotational deviation is highest (more force to move the privacy cover into the desired orientation) and lowest when the desired orientation is achieved. These trends are evidenced as lines 514 and 516 on graph 506. This example is provided for purposes of explanation. Different sizes, strengths, and/or numbers of magnets per array is contemplated. One such example is described below relative to FIG. 7.

Figure 6:
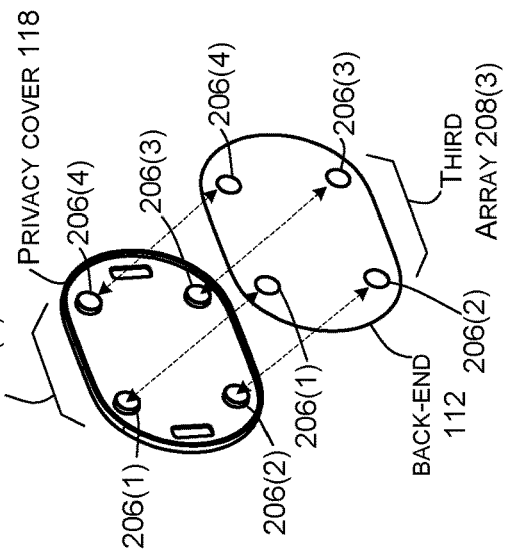
Figure 6:
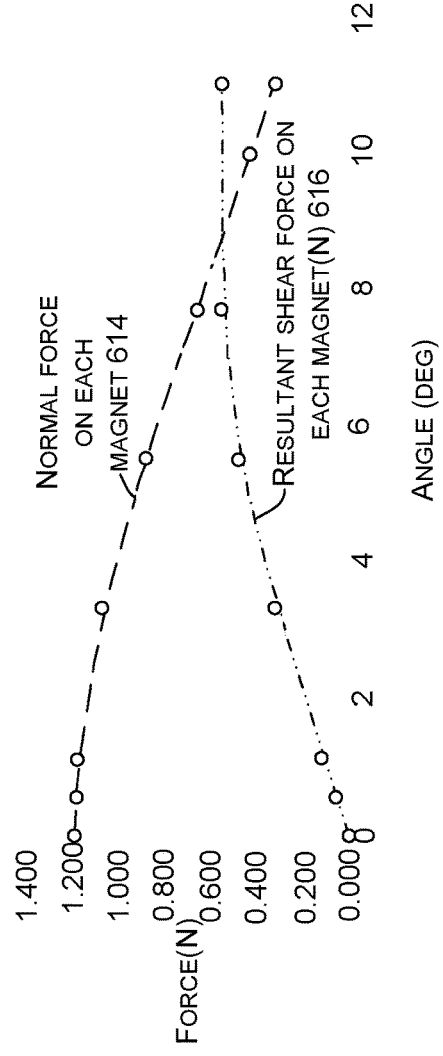

FIG. 6 shows an example implementation for privacy cover-back (rear)-auto alignment normal force and shear force with rotation at 602. FIG. 6 is similar to FIG. 5 except that it relates to magnetic arrays 208(1) and 208(3) (back-end) rather than 208(1) and 208(2) (front-end). In this case, the magnets 206 of the first array 208(1) and the third array 208(3) are N52 magnets. The magnets of the first array and the third array have a diameter of 6 mm and a thickness of 2 mm. Magnetic forces are created between individual magnet pairs of the first array 208(1) and the third array 208(3) as soon as the user gets the privacy cover 118 close to the back end 112, such as within a ¼ of an inch and within 10 degrees of rotation plus or minus from the desired orientation. For instance, magnet 206(1) of the first array 208(1) creates magnetic forces with magnet 206(1) of the third array 208(3), magnet 206(2) of the first array 208(1) creates magnetic forces with magnet 206(2) of the third array 208(3), magnet 206(3) of the first array 208(1) creates magnetic forces with magnet 206(3) of the third array 208(3), and magnet 206(4) of the first array 208(1) creates magnetic forces with magnet 206(4) of the third array 208(3).

A force per magnet chart in shown at 604 and a similar graph is shown at 606. The chart includes a row 608 that relates to privacy cover rotation in degrees relative to the camera back-end 112. Another row 610 relates to normal force on each magnet in Newtons (N). A final row 612 relates to resultant shear force on each magnet in Newtons. Columns represent values for 0 degrees of rotation (e.g., desired or aligned orientation), 0.5 degrees, 1 degree of rotation, 3 degrees of rotation, 5 degrees of rotation, 7 degrees of rotation, and 10 degrees of rotation. Note that the normal force increases as the privacy cover 118 and the back-end 112 approach the desired orientation (fewer degrees of rotational deviation). Thus, the holding or retaining force can be the highest when the privacy cover and the back-end are best aligned. Conversely, the shear forces are highest when the rotational deviation is highest (e.g., 10 degrees) (more force to move the structures into the desired orientation) and lowest when the desired orientation (e.g., zero degrees) is achieved. These trends are evidenced as lines 614 and 616 on graph 606. This example is provided for purposes of explanation. Different sizes, strengths, and/or numbers of magnets per array is contemplated. One such example is described below relative to FIG. 7.

Figure 7:
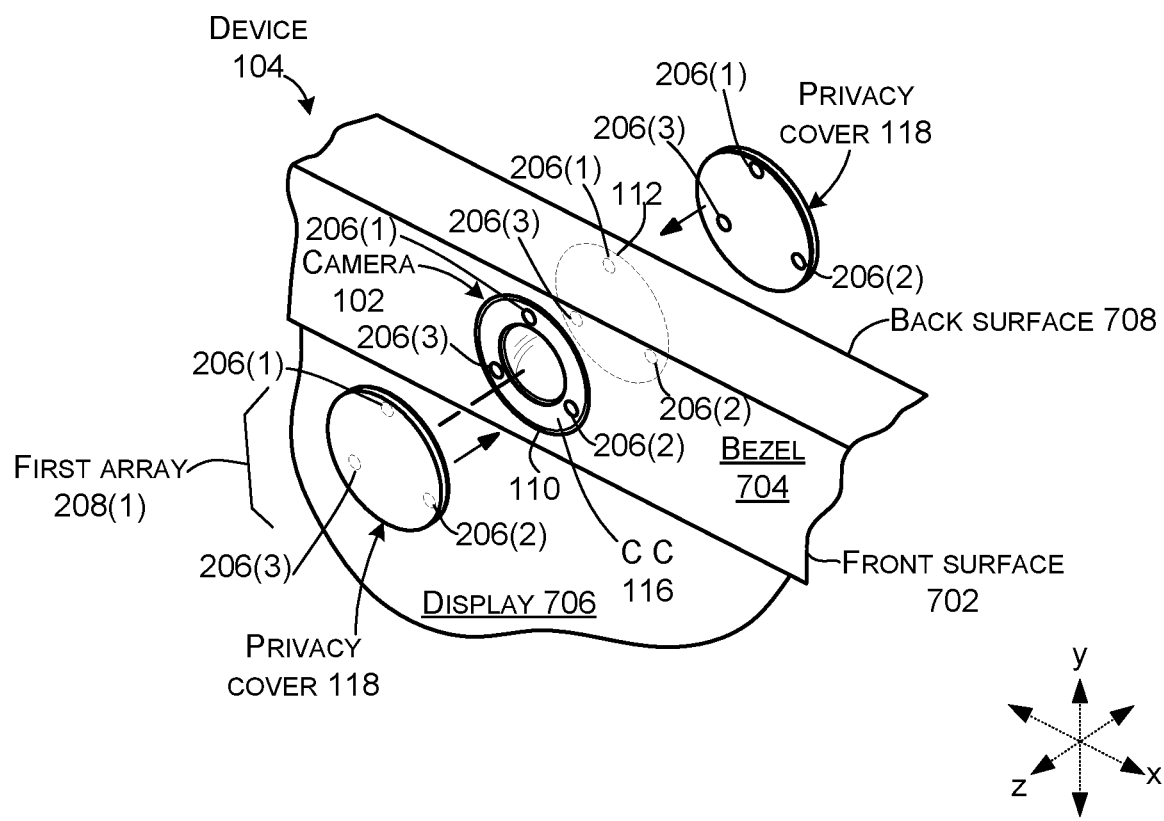

FIG. 7 shows another example system 100A. In this case camera 102 is built into device 104 such that a front-end 110 of the camera including the camera cone 116 is positioned relative to a front surface 702 of the device. In this example, the camera is positioned in a bezel 704 extending around a display 706 on the front surface 702 of the device. In this case, the back-end 112 of the camera 102 can be positioned on a back surface 708 of the device.

In this implementation, camera 102 approximates a circle and the camera cone 116 has the same circular shape and perimeter as the overall camera. In other cases, the camera cone may be a different shape and/or size from the camera. In this implementation, the privacy cover 118 approximates the circular shape and perimeter as the overall camera (e.g., has the same perimeter as the camera cone 116 and the overall camera 102).

In this configuration, a first array 208(1) of magnets 206 can be positioned in the privacy cover 118, a second array 208(2) of magnets 206 can be positioned in the front-end 110 (e.g., in the camera cone 116). A third array 208(3) of magnets 206 can be positioned in the back-end 112 of the camera 102. The first array 208(1) can interact with the second array 208(2) to provide magnetic attraction to automatically align and retain the privacy cover 118 on the front-end 110. The first array 208(1) can interact with the third array 208(3) to provide magnetic attraction to automatically align and retain the privacy cover 118 on the back-end 112. In the illustrated implementation, each array 208 includes three spaced-apart magnets 206. In this case, the three spaced-apart magnets 206 can approximate an equilateral triangle. The equilateral triangle, as with the square and rectangular configurations can reduce mis-alignment issues.

The description above relative to FIGS. 1A-6 relates to four magnets per array. Five or more magnets per array can also be employed. More magnets per array can increase the sheer and normal forces between the privacy cover 118 and the camera 102, but can increase weight and cost. Further, in contrast to the 'square' orientation of the four magnets that are oriented symmetrically around the axis of rotation 304, additional magnets can result in asymmetry depending on perimeter shape. For instance, five evenly spaced magnets could be positioned corresponding to clock positions at 12 o'clock, 2 o'clock, 5 o'clock, 7 o'clock, and 10 o'clock. However, if the privacy cover was installed upside down (e.g., with 12 o'clock at 6 o'clock) the magnets would not align properly and the resultant magnetic forces could tend to rotate the privacy cover to a non-aligned orientation.

The present self-aligning, self-retaining, privacy cover concepts can be utilized with any type of camera and/or device, such as but not limited to notebook computers, smart phones, wearable smart devices, tablets, vehicles, appliances, and/or other types of existing, developing, and/or yet to be developed devices.

Various methods of manufacture, assembly, and/or use for self-aligning, self-retaining, privacy covers are contemplated beyond those shown above relative to FIGS. 1A-7.

Although techniques, methods, devices, systems, etc., pertaining to self-aligning, self-retaining, privacy covers are described in language specific to structural features and/or methodological acts, it is to be understood that the subject matter defined in the appended claims is not limited to the specific features or acts described. Rather, the specific features and acts are disclosed as example forms of implementing the claimed methods, devices, systems, etc.

Various examples are described above. Additional examples are described below. One example includes a camera comprising a body defining a front-end and an opposing back-end that have matching perimeters, a lens positioned in the front-end, a first array of magnetic elements positioned at the front-end and a matching second array of magnetic elements positioned at the back-end, and an opaque privacy cover having a perimeter that matches both the front-end perimeter and the back-end perimeter, the opaque privacy cover including a third array of magnetic elements configured to work cooperatively with the first array of magnetic elements to automatically align and retain the opaque privacy cover on the front-end and that is configured to work cooperatively with the second array of magnetic elements to alternatively automatically align and retain the opaque privacy cover on the back-end.

Another example can include any of the above and/or below examples where the first array of magnetic elements, the second array of magnetic elements, and the third array of magnetic elements each comprise four evenly spaced magnetic elements.

Another example can include any of the above and/or below examples where the lens is surrounded by a curved camera cone on the front-end and wherein the first array of magnetic elements is positioned behind the curved camera cone.

Another example can include any of the above and/or below examples where the magnetic elements of the first array positioned behind the curved camera cone are larger than the magnetic elements of the second array and the third array.

Another example can include any of the above and/or below examples where the magnetic elements of the first array positioned behind the curved camera cone are stronger than the magnetic elements of the second array and the third array.

Another example can include any of the above and/or below examples where the opaque privacy cover includes a low friction contact member that is configured to contact the camera.

Another example can include any of the above and/or below examples where the low friction contact member has a static friction coefficient of less than 0.3.

Another example can include any of the above and/or below examples where the low friction contact member is a fluoropolymer, a polycarbonate/acrylonitrile-butadiene-styrene terpolymer blend, a thermoplastic elastomer (TPE), and/or thermoplastic polyurethane (TPU).

Another example can include any of the above and/or below examples where the opaque privacy cover, the front-end, and the back-end are elongate.

Another example includes a device comprising a body defining a front-end and an opposing back-end that have matching profiles, a lens positioned in the front-end, and an opaque privacy cover configured to automatically self-align and self-retain against the front-end and the back-end of the body and having a profile configured to match both the front-end profile and the back-end profile of the body.

Another example can include any of the above and/or below examples where the front-end, the back-end, and the opaque privacy cover are elongate.

Another example can include any of the above and/or below examples where the device further comprises an array of magnetic elements in the opaque privacy cover and arrays of magnetic elements in the front-end and the back-end collectively provide the self-aligning and self-retaining features.

Another example can include any of the above and/or below examples where the matching profiles are of identical sizes.

Another example can include any of the above and/or below examples where the opaque privacy cover comprises a low friction contact member.

Another example can include any of the above and/or below examples where the low friction contact member comprises a coating.

Another example can include any of the above and/or below examples where the low friction contact member comprises a layer of material secured to the opaque privacy cover.

Another example includes a system comprising a device that includes a display, a camera including a lens positioned in a camera cone and configured to capture images in front of the display, and an opaque privacy cover having a perimeter that matches a perimeter of the camera cone, and wherein the opaque privacy cover is magnetically attracted to the camera cone to align a specific point on the perimeter of the privacy cover with a corresponding specific point on the perimeter of the camera cone and to retain the opaque privacy cover against the camera cone.

Another example can include any of the above and/or below examples where the camera comprises a body and wherein the perimeter of the camera cone matches a perimeter of the body or wherein the perimeter of the camera cone is different than the perimeter of the body.

Another example can include any of the above and/or below examples where the opaque privacy cover comprises an array of magnets and the camera cone comprises another array of magnets and wherein interaction of the array and the another array cause the opaque privacy cover to be magnetically attracted to the camera cone.

Another example can include any of the above and/or below examples where the array and the another array automatically correct any linear offset and/or rotational offset to align the specific point of the opaque privacy cover to the corresponding specific point on the camera cone.

The invention claimed is:

1. A camera, comprising:
    a body defining a front-end and an opposing back-end that have matching perimeters;
    a lens positioned in the front-end;
    a first array of magnetic elements positioned at the front-end and a matching second array of magnetic elements positioned at the back-end; and,
    an opaque privacy cover having a perimeter that matches both the front-end perimeter and the back-end perimeter, the opaque privacy cover including a third array of magnetic elements configured to work cooperatively with the first array of magnetic elements to automatically align and retain the opaque privacy cover on the front-end and that is configured to work cooperatively with the second array of magnetic elements to alternatively automatically align and retain the opaque privacy cover on the back-end, the magnetic elements of the first array being stronger than the magnetic elements of the second array.

2. The camera of claim 1, wherein the first array of magnetic elements, the second array of magnetic elements, and the third array of magnetic elements each comprise four evenly spaced magnetic elements.

3. The camera of claim 2, wherein the lens is surrounded by a curved camera cone on the front-end and wherein the first array of magnetic elements is positioned behind the curved camera cone.

4. The camera of claim 1, wherein the magnetic elements of the first array are larger than the magnetic elements of the second array.

5. The camera of claim 1, wherein the magnetic elements of the first array are stronger than the magnetic elements of the third array.

6. The camera of claim 1, wherein the opaque privacy cover includes a low friction contact member that is configured to contact the camera.

7. The camera of claim 6, wherein the low friction contact member has a static friction coefficient of less than 0.3.

8. The camera of claim 6, wherein the low friction contact member is a fluoropolymer, a polycarbonate/acrylonitrile-butadiene-styrene terpolymer blend, a thermoplastic elastomer (TPE), and/or thermoplastic polyurethane (TPU).

9. The camera of claim 1, wherein the opaque privacy cover, the front-end, and the back-end are elongate.

10. A device, comprising:
    a body defining a front-end and an opposing back-end, the front-end having a front-end profile, the back-end having a back-end profile, the front-end profile matching the back-end profile;
    a lens positioned in the front-end; and,
    an opaque privacy cover including a low friction contact member, configured to automatically self-align and self-retain against the front-end and the back-end of the body, and having a cover profile configured to match both the front-end profile and the back-end profile.

11. The device of claim 10, wherein the front-end, the back-end, and the opaque privacy cover are elongate.

12. The device of claim 10, further comprising an array of magnetic elements in the opaque privacy cover and arrays of magnetic elements in the front-end and the back-end collectively provide the self-aligning and self-retaining features.

13. The device of claim 10, wherein the front-end profile and the back-end profile are of identical sizes.

14. The device of claim 10, wherein the low friction contact member comprises a coating.

15. The device of claim 10, wherein the low friction contact member comprises a layer of material secured to the opaque privacy cover.

16. The device of claim 10, further comprising:
    a camera cone, the lens being positioned in the camera cone, the camera cone having a cone profile that matches the front-end profile.

17. A system, comprising:
    a device that includes a display;
    a camera including a lens positioned in a camera cone and configured to capture images in front of the display; and,
    an opaque privacy cover having a perimeter that matches a perimeter of the camera cone, and wherein the opaque privacy cover is magnetically attracted to the camera cone to align a specific point on the perimeter of the privacy cover with a corresponding specific point on the perimeter of the camera cone and to retain the opaque privacy cover against the camera cone.

18. The system of claim 17 wherein the camera comprises a body and wherein the perimeter of the camera cone matches a perimeter of the body or wherein the perimeter of the camera cone is different than the perimeter of the body.

19. The system of claim 17, wherein the opaque privacy cover comprises an array of magnets and the camera cone comprises another array of magnets and wherein interaction of the array and the another array cause the opaque privacy cover to be magnetically attracted to the camera cone.

20. The system of claim 19, wherein the array and the another array automatically correct any linear offset and/or rotational offset to align the specific point of the opaque privacy cover to the corresponding specific point on the camera cone.

\* \* \* \* \*